United States Patent
Madl et al.

(10) Patent No.: US 11,895,223 B2
(45) Date of Patent: Feb. 6, 2024

(54) CROSS-CHAIN VALIDATION

(71) Applicant: International Business Machines Corporation, Armonk, NY (US)

(72) Inventors: Gabor Madl, San Jose, CA (US); Luis Angel D. Bathen, Placentia, CA (US); Ramani R. Routray, San Jose, CA (US); Diego A. Masini, La Plata (AR); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 16/269,090

(22) Filed: Feb. 6, 2019

(65) Prior Publication Data
US 2020/0252202 A1    Aug. 6, 2020

(51) Int. Cl.
*H04L 9/06*    (2006.01)
*G06F 21/62*   (2013.01)
*G06F 21/64*   (2013.01)
*H04L 9/32*    (2006.01)
*H04L 9/00*    (2022.01)

(52) U.S. Cl.
CPC ........ *H04L 9/0637* (2013.01); *G06F 21/6218* (2013.01); *G06F 21/64* (2013.01); *H04L 9/0643* (2013.01); *H04L 9/3263* (2013.01); *H04L 9/50* (2022.05)

(58) Field of Classification Search
None
See application file for complete search history.

(56) References Cited

U.S. PATENT DOCUMENTS

| | | |
|---|---|---|
| 10,121,025 B1 * | 11/2018 | Rice ................. G06F 21/10 |
| 2017/0033932 A1 | 2/2017 | Truu et al. |
| 2017/0039330 A1 | 2/2017 | Tanner et al. |
| 2017/0041296 A1 | 2/2017 | Ford et al. |
| 2017/0046806 A1 | 2/2017 | Haldenby et al. |
| 2018/0121923 A1 | 5/2018 | Uhr et al. |
| 2018/0225660 A1 * | 8/2018 | Chapman ........... G06Q 20/389 |
| 2019/0081793 A1 * | 3/2019 | Martino ............. H04L 9/0894 |

(Continued)

OTHER PUBLICATIONS

Xiao, Y., Zhang, N., Lou, W. and Hou, Y.T., 2020. A survey of distributed consensus protocols for blockchain networks. IEEE Communications Surveys & Tutorials, 22(2), pp. 1432-1465. (Year: 2020).*

(Continued)

*Primary Examiner* — Roderick Tolentino
*Assistant Examiner* — Edward X Long

(57) ABSTRACT

An example operation may include one or more of receiving a request to certify a digital record, retrieving a first hashed data value of the digital record from a data block included among a first hash-linked chain of blocks on a first blockchain, retrieving a second hashed data value of the digital record from a second data block included among a second hash-linked chain of blocks on a second blockchain which is different from the first blockchain, determining whether the digital record is valid based on a cross-validation of the first hashed data value and the second hashed data value, and storing the determination of the validity of the digital record in a data block among a third hash-linked chain of blocks.

12 Claims, 13 Drawing Sheets

(56) References Cited

U.S. PATENT DOCUMENTS

| | | | | |
|---|---|---|---|---|
| 2019/0280875 A1* | 9/2019 | Ragnoni | ............... | G06F 21/64 |
| 2020/0034945 A1* | 1/2020 | Soundararajan | ...... | G06T 1/0021 |
| 2020/0220725 A1* | 7/2020 | Hudson | ............... | H04W 12/06 |
| 2020/0412731 A1* | 12/2020 | Gulbrandsen | ......... | G06F 21/604 |
| 2021/0152366 A1* | 5/2021 | Wang | ................... | G06F 21/645 |

OTHER PUBLICATIONS

Bhowmik, D. and Feng, T., Aug. 2017. The multimedia blockchain: A distributed and tamper-proof media transaction framework. In 2017 22nd International conference on digital signal processing (DSP) (pp. 1-5). IEEE. (Year: 2017).*

Blockcerts, The Open Standard for Blockchain Credentials, Feb. 5, 2019.

Jagers, Chris, Blockchain will Revolutionize Academic Credentialing, Oct. 29, 2016, Presentation given at the Anaheim Convention Center.

Watters, Audrey, The Ideology of the Blockchain (for Education), Published Apr. 14, 2016.

* cited by examiner

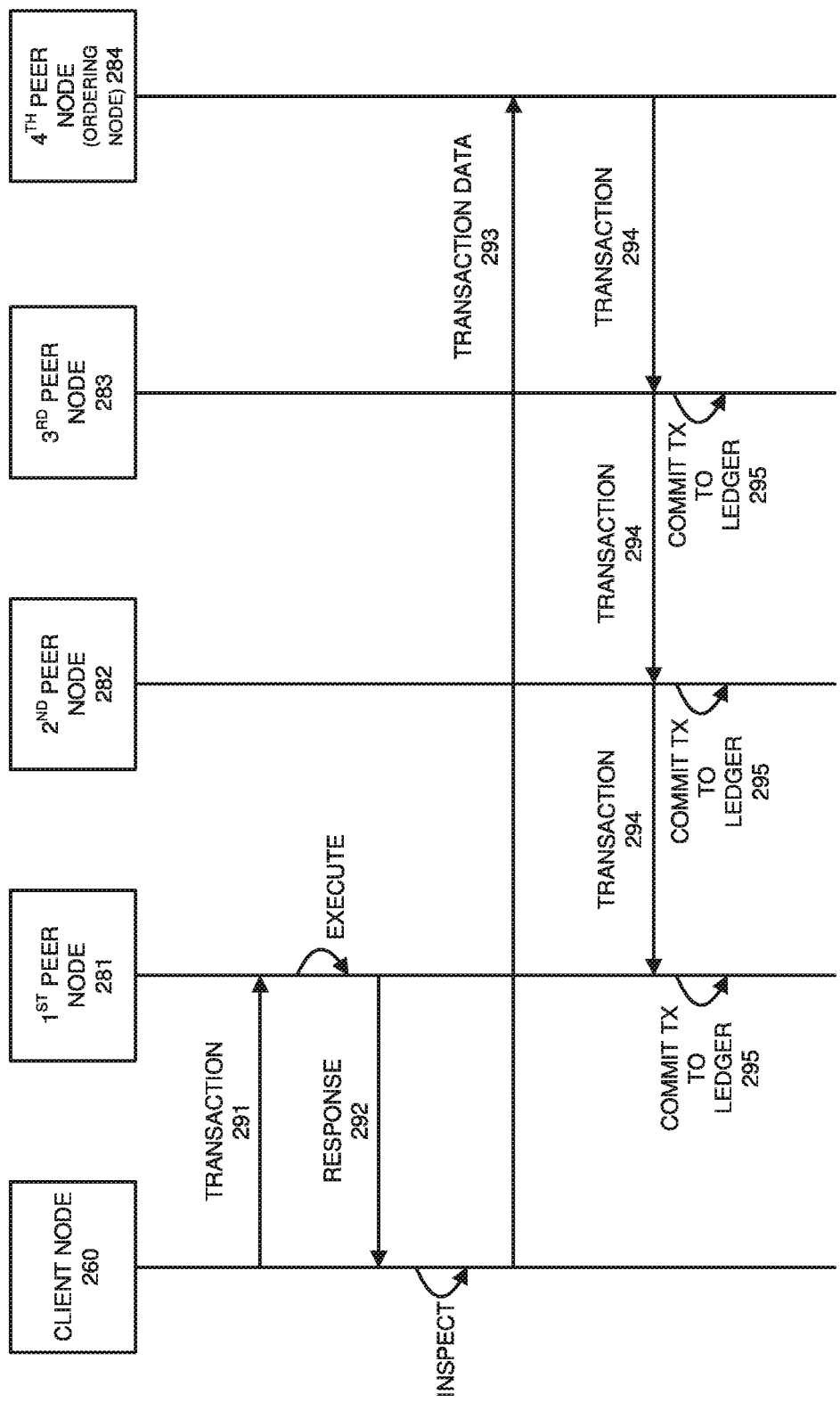

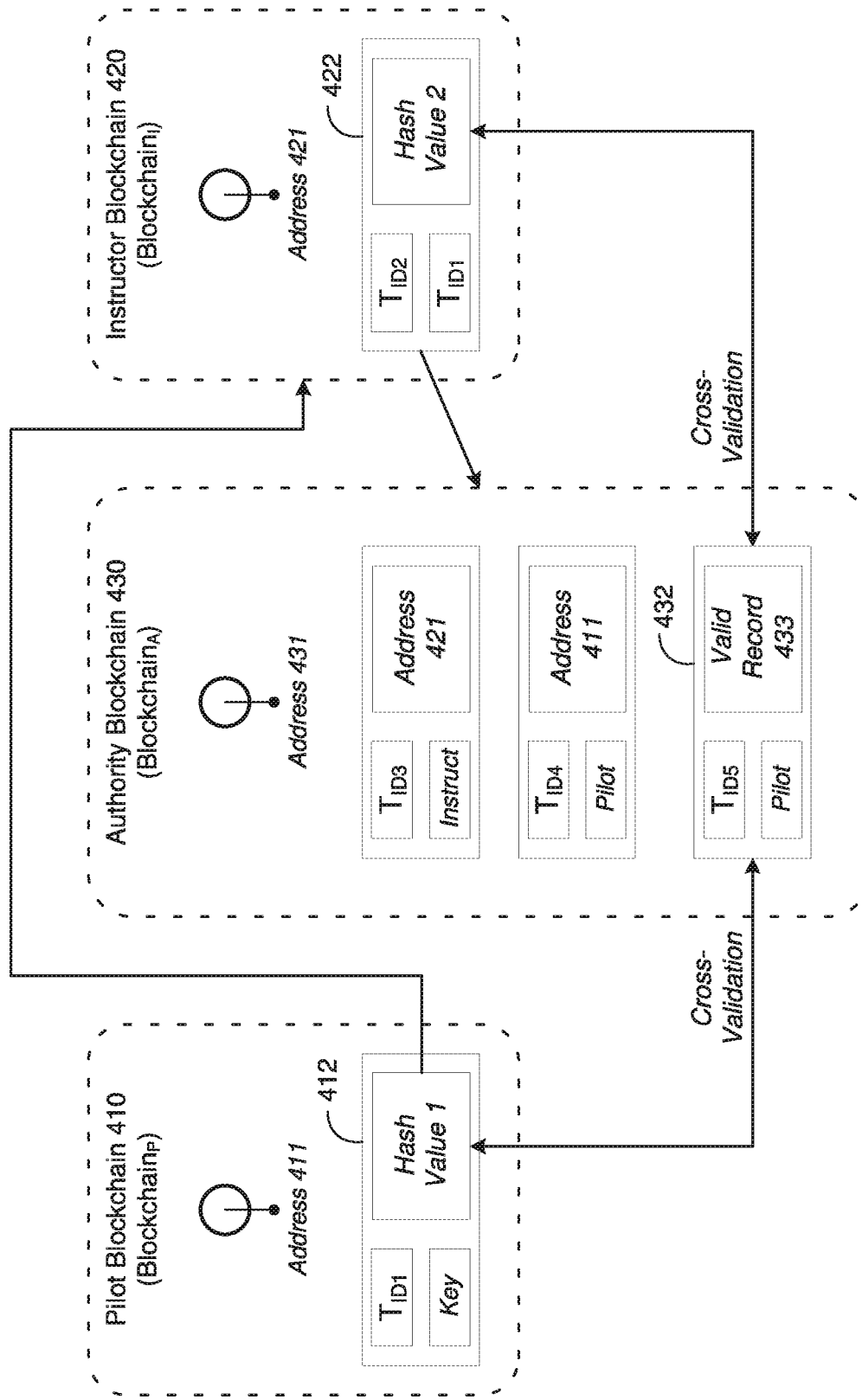

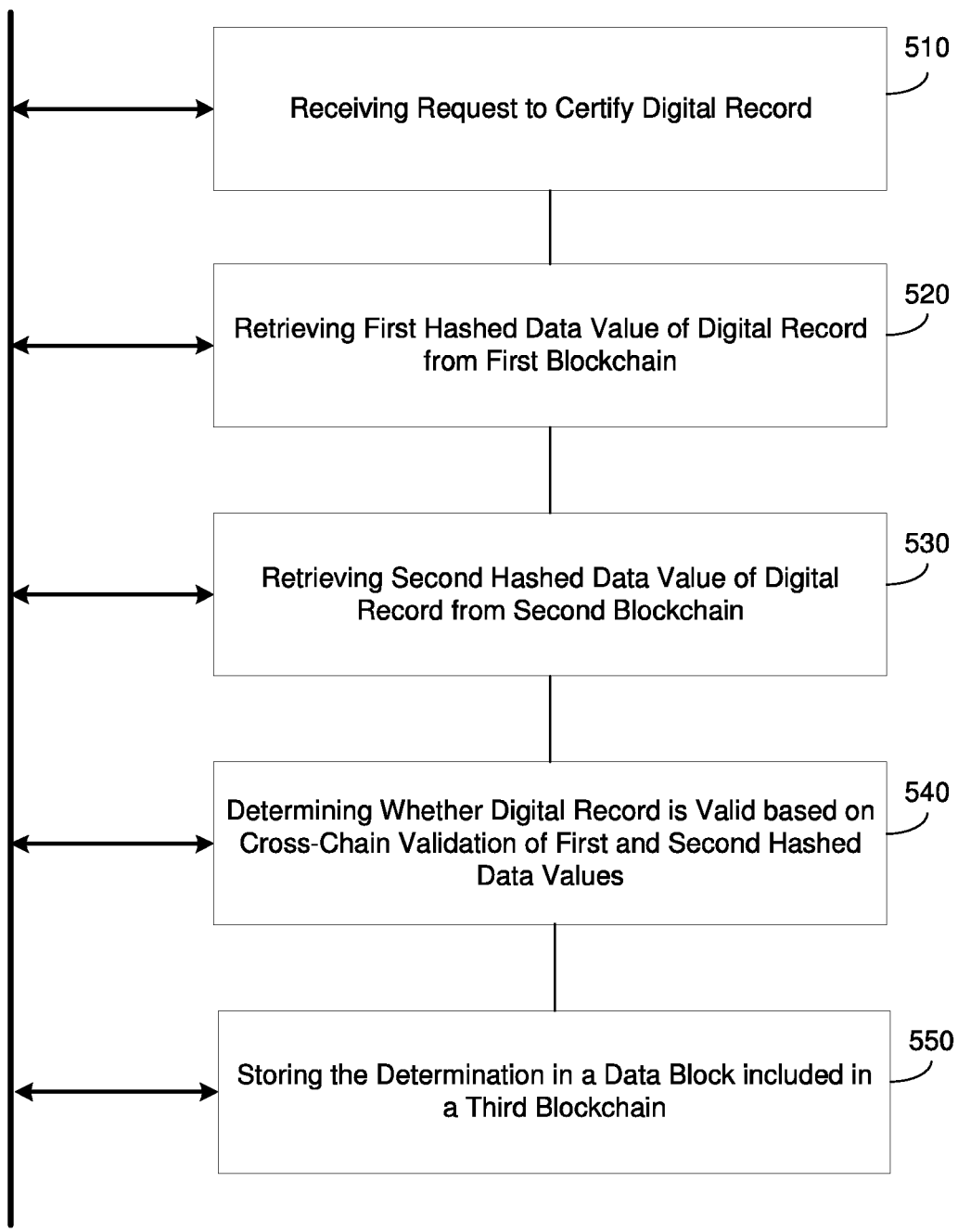

600

CROSS-CHAIN VALIDATION

TECHNICAL FIELD

This application generally relates to a blockchain system, and more particularly, to process of validating the contents of a digital record based on information retrieved and validated from multiple blockchains.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost can be difficult to retrieve other than through manual operation from back-up disk storage.

Across global supply chains, financial services, healthcare, government and many other industries, innovators are exploring ways to use blockchain to disrupt and transform traditional storage into a decentralized storage scheme. Many industry leaders have already achieved significant business benefits, including greater transparency, enhanced security, improved traceability, increased efficiency and speed of transactions, and reduced costs, through the use of blockchain storage.

Blockchain provides a tamper-proof ledger files. However, storing large data files such as multimedia data directly in a blockchain is cost prohibitive, may unnecessarily increase resource utilization, and may decrease the throughput of a service associated with the records. Accordingly, a mechanism is needed for storing large data files while still providing tamper-proof protection of the data therein.

SUMMARY

One example embodiment may provide a system that includes one or more of a network interface configured to receive a request to certify a digital record, a processor configured to one or more of retrieve a first hashed data value of the digital record from a data block included among a first hash-linked chain of blocks on a first blockchain, retrieve a second hashed data value of the digital record from a second data block included among a second hash-linked chain of blocks on a second blockchain which is different from the first blockchain, and determine whether the digital record is valid based on a cross-validation of the first hashed data value and the second hashed data value, and a storage configured to store the determination of the validity of the digital record in a data block among a third hash-linked chain of blocks.

Another example embodiment may provide a method that includes one or more of receiving a request to certify a digital record, retrieving a first hashed data value of the digital record from a data block included among a first hash-linked chain of blocks on a first blockchain, retrieving a second hashed data value of the digital record from a second data block included among a second hash-linked chain of blocks on a second blockchain which is different from the first blockchain, determining whether the digital record is valid based on a cross-validation of the first hashed data value and the second hashed data value, and storing the determination of the validity of the digital record in a data block among a third hash-linked chain of blocks.

Another example embodiment may provide a non-transitory computer readable medium comprising instructions, that when read by a processor, cause the processor to perform one or more of receiving a request to certify a digital record, retrieving a first hashed data value of the digital record from a data block included among a first hash-linked chain of blocks on a first blockchain, retrieving a second hashed data value of the digital record from a second data block included among a second hash-linked chain of blocks on a second blockchain which is different from the first blockchain, determining whether the digital record is valid based on a cross-validation of the first hashed data value and the second hashed data value, and storing the determination of the validity of the digital record in a data block among a third hash-linked chain of blocks.

BRIEF DESCRIPTION OF THE DRAWINGS

FIG. 2B is a diagram illustrating a peer node blockchain configuration, according to example embodiments.

FIG. 4 is a diagram illustrating a cross-validation process based on data from a plurality of blockchains according to example embodiments.

FIG. 5 is a diagram illustrating a method of performing cross-validation of blockchain data according to example embodiments.

DETAILED DESCRIPTION

Figure 1:
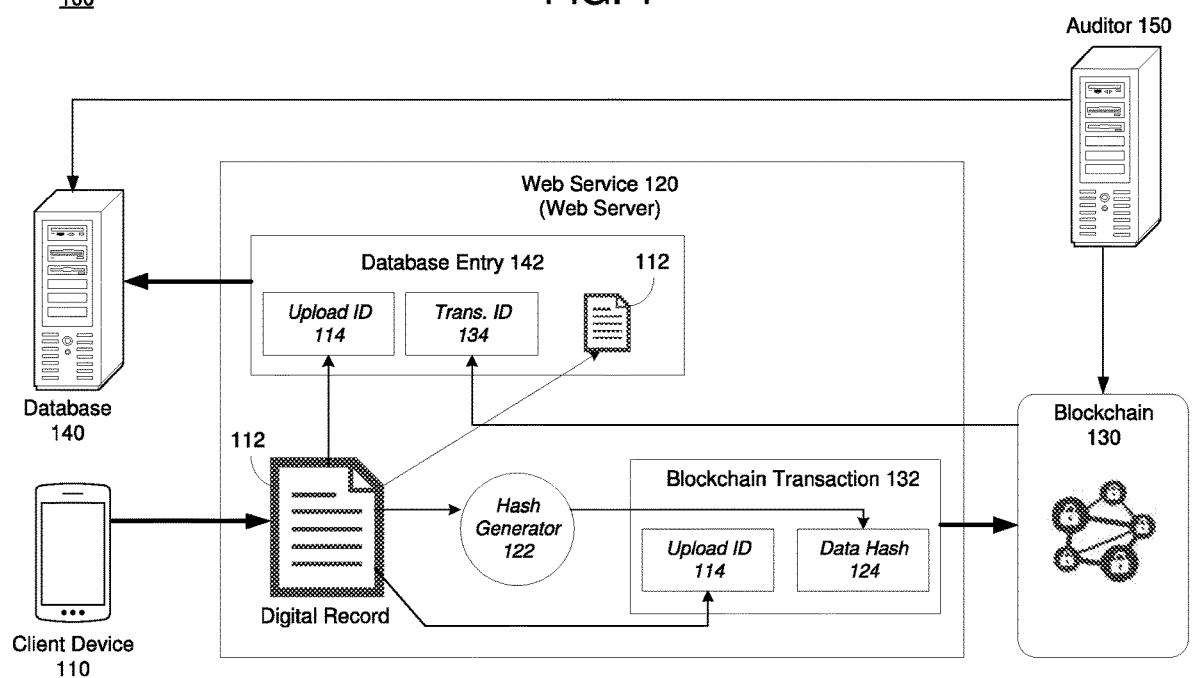
FIG. 1 is a diagram illustrating a web service for validation of digital records according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which are directed to a tamper-proof web service capable of storing digital data files (e.g., documents, images, certificates, licenses, video, audio, etc.) off-chain such as in a database while storing proof of content within the data files via blockchain. The web service may validate a digital data file without actually looking at the content of the digital data file by validating entries associated with the digital data file that are stored in different (untrusting) blockchains.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain is an emerging paradigm for tamper-proof persistent distributed databases. A Blockchain consists of a sequence of records called blocks that store data. The example embodiments are directed to a certification service for digital records using blockchain. As an example, digital records may represent significant events, achievements, licenses, certifications, or memories in a person's life. Digital records may be in the form of text, documents, photos, audio, video, multimedia data, and the like. Blockchain is utilized to provide a tamper-proof signature service and validation. The purpose of the service is to provide a tamper-proof service to validate the integrity of digital records via smart contracts. Each user of the service has at least one blockchain assigned to the user, that the user can use to store digital records. Blockchain is utilized both as a tamper-proof persistent storage, as well as the mechanism to manage and validate digital signatures.

Storing large files such as multimedia data directly in a blockchain is cost prohibitive, may increase resource utilization needlessly, and may decrease the throughput of the service. To overcome these challenges, the system herein integrates blockchain with a traditional distributed database. Hash codes may be applied to the metadata of digital records to create hashes of the data which are smaller in size than the original data and which can be used to uniquely identify digital records. This approach provides a method to store arbitrary data of any size while also preserving the tamper-proof guarantees of Blockchain through the use of proper hash functions. Furthermore, the system implements a newly defined cross-chain validation process. Through the cross-chain validation, the system is able to verify the validity of the content (e.g., data, claims, etc.) of the digital records through the use of digital signing across multiple chains. Furthermore, parts of the solution can be automated through the use of smart contracts.

The certification service may implement a digital signature service and validation built on top of blockchain. Consider the problem of licensing or certifying an individual with respect to a skill. The individual might need several examiners to sign off his progress and demonstrate that he has the required skills to earn his license. He might also have to submit evidence of work performed. Examiners then digitally sign the individual's license in their own blockchain, and transmit the transaction hash to the user/and or authorities overseeing the licensing. Blockchain may be used to automate the process of certification, as well as the validation service.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, inherent blockchain properties such as immutability, smart contracts, security, and other, are used to implement the example embodiments. The tamper-proof service may rely on the immutable property of blockchain to ensure that the persistent entry consisting of an upload identification (ID) and data hash is not tampered with. The service may then use the data hash to verify the validity of the data in the scalable database. The service may also rely on the immutability of the blockchain for a cross-chain validation service as well. In this case, signatures generated by multiple untrusting parties (with evidence of the digital record) are immutable and are used to ensure the validity of the data.

Smart contracts can be employed to automate parts of the cross-chain validation service. For example, to perform the cross-validation service, a user may send a blockchain address and a public key to an authority. A smart contract can then be written that automatically takes this input data and generates the new block in the authority registry. The system herein may also rely on security provided by a blockchain for the integrity of the cross-chain validation service. Data is replicated across nodes of the blockchain. The system herein has a distributed attribute. Both the blockchain as well as the external database may be scalable distributed platforms. Consensus protocol provided by the blockchain may be used to ensure immutability and the validity of data written on the blockchain. Endorsement may be used for the cross-chain validation. For example, when an instructor signs a transaction (proof of a digital record) through the cross-chain validation service, the instructor endorses the validity of a claim of the user having achieved the digital record (e.g., passing an exam, etc.). Furthermore, the distributed nature of the platform ensures accessibility and high availability. Even if nodes at the edge have access to only one node of the scalable distributed database, they can access the data stored in it.

The blockchain is a distributed ledger, but distributed ledgers are not necessarily blockchains. A traditional distributed ledger (database) has no concept of chains, and proof of work. Therefore, if the example embodiments were implemented on a traditional database, the data written to the database would not be guaranteed immutable. If the system cannot guarantee the immutability of the digital record data, the solution will not work.

FIG. 1 illustrates a web service 120 implementing a cross-chain validation service for validation of digital records according to example embodiments. Referring to FIG. 1, a network environment 100 includes a web server which implements the web service 120. The network 100 further includes a client 110 which uploads data (e.g., a digital record 112) to the web service 120 via network communication such as Internet, etc. The upload of the digital record 112 may include an upload ID 114 which is generated by the client 110.

To create the tamper-proof storage of the digital record 112, a copy of the digital record 112 may be stored within a database 140 while a hash 124 of the digital record may be stored on a blockchain 130. For example, the web service 120 may create the hash 124 of the digital record 112 based on a hash generator 122. The hash 124 may be significantly smaller in size than the digital record 112 to conserve space on the blockchain. The hash 124 may be subsequently decrypted to reveal the content included in the digital record 112. Next, the web service 120 may generate a blockchain transaction 132 for storage on the blockchain 130 which includes a copy of the hash 124 and the upload ID 114. Furthermore, the web service 120 may receive a blockchain transaction ID 134 created by the blockchain 130 when the transaction 132 is stored which identifies the blockchain transaction 132 storing the hash 124 of the digital record and the upload ID 114 on the blockchain 130. To create a link between the blockchain transaction 132 and a database entry 142 storing a copy of the digital record 112, the web service 120 may store the blockchain transaction identifier 134 within the database entry 142 along with the upload ID 114.

The result of the storage process shown in FIG. 1, creates a copy of the digital record 112 stored on the database 140 within database record 142, and a hash 124 of the digital record 112 stored on the blockchain 130. To link the two together storages together, the upload ID 114 may be stored in both the database entry 142 and the blockchain transaction 132. In addition, the blockchain transaction ID 132 may be stored in the database entry 142. An auditor 150 may verify that the hash 124 stored on the blockchain 130 is the same as the digital record 112 stored on the database 140 by decrypting the hash 124 based on a public key of the client 110.

The web service 120 may be referred to as a persistence service. Clients 110 may access the persistence service 120 through the web. One example of the client 110 is a smart phone with an embedded wallet application, but embodiments are not limited thereto. The client 110 may include a camera, an IoT sensor, a tablet, a personal computer, an appliance, an asset, and the like. The client 110 may upload digital records 112 such as photos, documents, videos, audios, multimedia data, and the like. When the digital record 112 is uploaded the client 110 may generate the unique upload ID 114 based on the metadata of the multimedia upload. The metadata may contain information such as the time and location of the upload, the uploader's user identification, as well as properties of the multimedia file itself.

Once the multimedia data is uploaded, the web service 120 may generate the hash (124 from the upload data. A new persistent key-value object may be created (i.e., blockchain transaction 132) which includes the upload ID 114 as the key and the hash 124 as the data value associated with the key. The blockchain transaction 132 may be pushed to the blockchain 130, which generates the unique transaction ID 134. Transactions may be mined via a tunable consensus mechanism (e.g., proof-of-work in a permission-less blockchain or practical byzantine fault tolerance (PBFT) in a permissioned blockchain).

In the next step, the database entry 142 is created. The database entry 142 stores the digital record 112, and the data is indexed using both the upload ID 114 and the transaction ID 134 created by the blockchain 130. The database entry 142 is then written to the database 140 which may be a scalable distributed database, such as Cloudant, MongoDB, or a distributed hash table (DHT). This completes the upload to the tamper-proof persistence service 120. To verify the integrity of digital record 112 stored by the persistence service 120, the auditor 150 needs access to both the key value store of the blockchain 130, as well as the database 140. The auditor 150 may query the persistent key-value store of the blockchain 130 using the upload ID 114 to obtain the data hash 124 and the transaction ID 134. In the next step, the auditor 150 may perform a query on the database 140 using either the transaction ID 134 or the upload ID 114 (or both) to obtain the digital record 112. Further, the auditor 150 may invoke a hash verification service to generate a hash of the digital record 112. The verification service may further determine whether the generated hash matches the data hash 124 stored in the key-value store of the blockchain 130. If the digital record 112 is altered in any way, the mismatch can be detected by the auditor 150 due to the mismatch between the hash values.

In the example of FIG. 1, one client is shown and one blockchain is shown. However, it should be appreciate that multiple clients, multiple blockchains, multiple DBs, and the like, may be accessed by the web service 120. For example, data associated with a digital record may be stored across multiple blockchains associated with independent users (untrusting entities). The web service 120 may validate the data based on content associated with the digital record which is extracted from multiple blockchains. That is, the web service 120 may perform a cross-validation of a digital record based on data stored in multiple blockchains. An example of a cross-validation process is shown in FIG. 4.

Figure 2A:
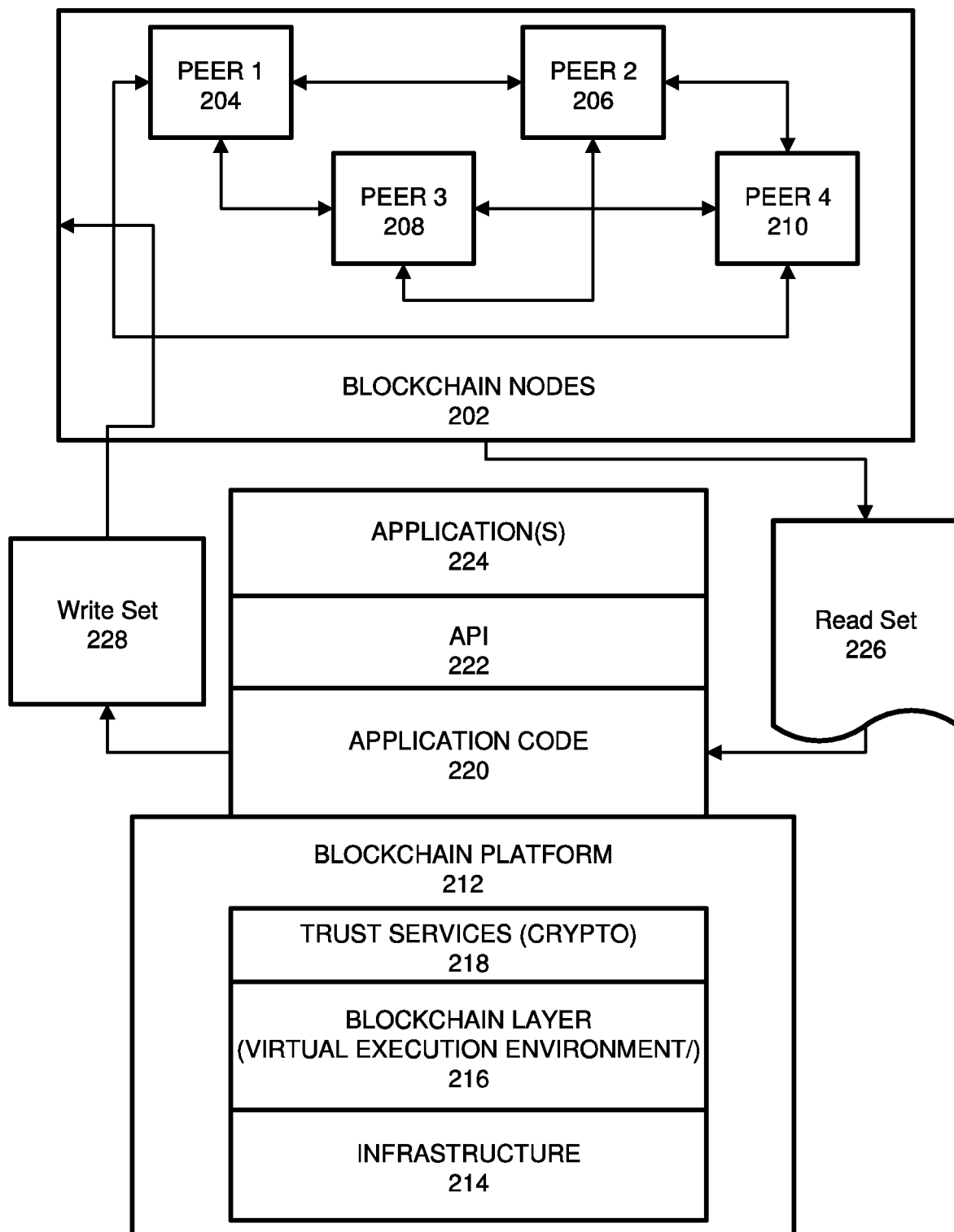
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on an endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/ verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
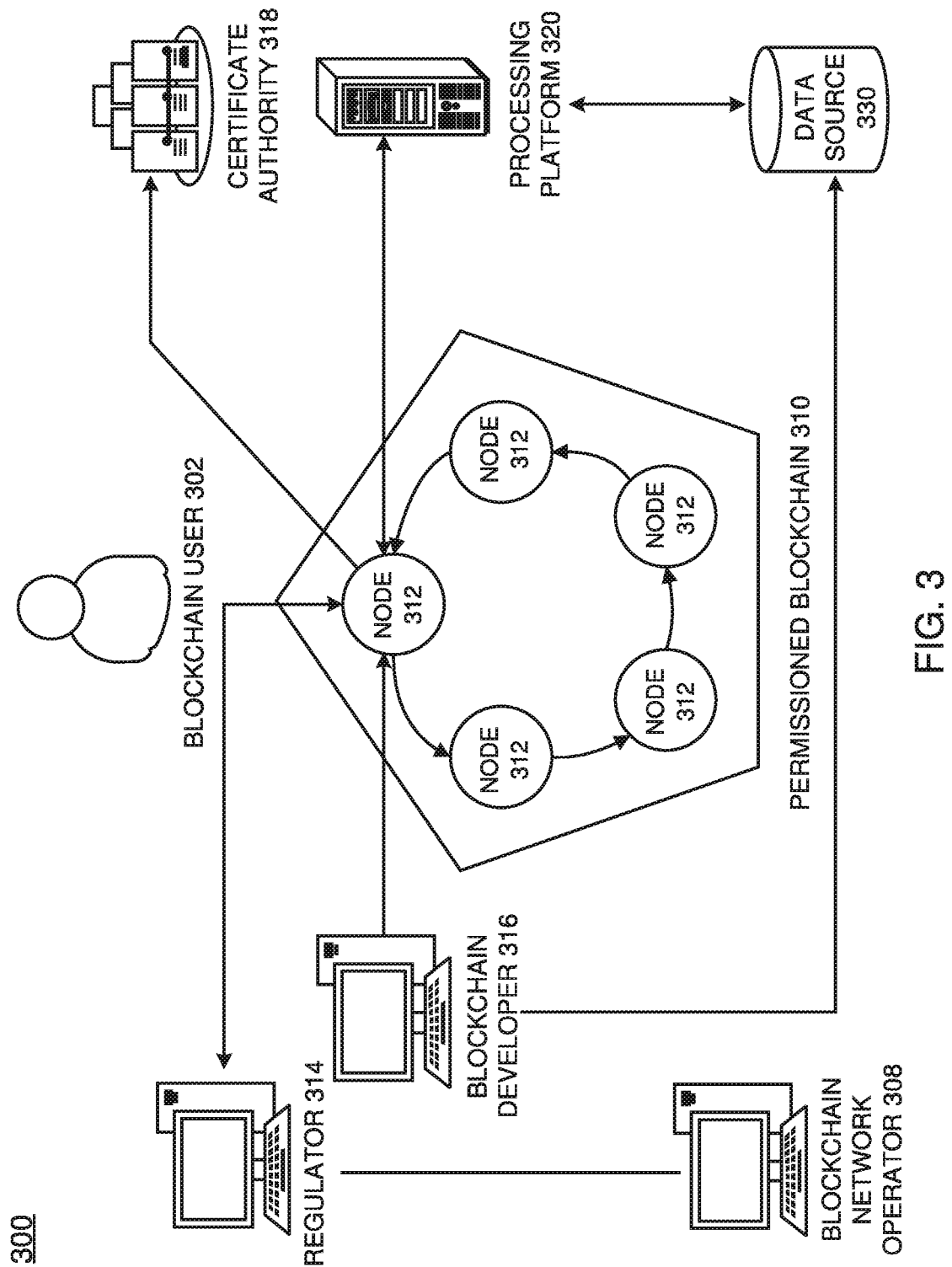
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIG. 4 illustrates a cross-validation process 400 based on data from a plurality of blockchains according to example embodiments. In this example, the web service described herein may have access to a plurality of blockchains 410, 420, and 430 which are associated with untrusting parties including a pilot, an instructor, and a licensing authority, respectively. In this example, each participant has a blockchain that stores their data as blocks in the tamper-proof web service. Participants can validate data by verifying the validity of block transaction ids which may be captured as hash numbers, or signatures across different chains. Cross-validation between different blockchains can be coordinated by the web service through exchanges.

As an example, if a participant wants to use a particular service (e.g., a license bar), it has to register an address associated with its blockchain with the web service. In addition, every participating party must publish their public keys to the service to enable cross-validation. In the example of FIG. 4, a pilot stores an address 411 of a pilot blockchain 410 with an authority which includes a separate blockchain 430. Likewise, an instructor of the pilot stores an address 421 of an instructor blockchain 420 with the authority. Here, the blockchain addresses (and public keys of the pilot and the instructor) can be stored in the blockchain 430 of the authority on the service side to prevent tampering. In the blockchain implementation, three fields may be included in each block; (a) the transaction id of a hash value unique to the block, (b) the key, and (c) the value field.

In the beginning of the process 400, the certification authority's blockchain 430 contains a block for the flight instructor which the blockchain 430 assigns a transaction ID of $T_{ID3}$. The key in this simplified example is the name of the instructor and the value field specifies the address 421 of the blockchain 420 of the instructor, as well as his status as instructor. In this example, a pilot wants to earn his pilot license, and his first step is to register with the authority. He sends the address 411 of his blockchain 410 and his public key to the authority. The authority then generates a new block which the blockchain 430 assigns a transaction ID of $T_{ID4}$, with the pilot's name as the key. The value field contains the blockchain address 411, his public key, and the pilot candidate designation.

In this example, the pilot generates a flight exam session entry 412, and stores it in its own blockchain 410. The key may be a reference to a name of the class or some other value, and the value field may includes the description of the flight exam, as well as its date. Here, a transaction ID $T_{ID1}$ is created when the block is stored in the blockchain 410. The pilot may digitally sign the transaction ID $T_{ID1}$ with its private key, and sends it over to the instructor. In response, the instructor may perform a lookup with the authority based on the pilot's name. The instructor may then verify the authenticity of the message using the public key of the pilot. After the flight exam is over, the instructor may generates a new block in the blockchain 420. The key of the block contains the transaction id received from the pilot $T_{ID1}$ as the key. The value field contains the passing designation, as well as the time when the pilot passed the exam.

In response to the transaction being stored on the blockchain 420, a new transaction ID is created $T_{ID2}$. Here, the instructor may sign the newly generated transaction identifier $T_{ID2}$ with his private key, and sends it to the authority. In response, the authority may verify the authenticity of the message based on the public key of the instructor. Further, the authority may perform a lookup in blockchain 420 using transaction $T_{ID2}$ to confirms that the pilot's exam with transaction id $T_{ID1}$ had a passing grade. The FAA then performs a lookup in blockchain 410 to confirm the flight exam and date. After this cross-validation (across blockchains 410 and 420), the authority may issue a new license to the pilot by generating a new block 432 that contains the pilot's name as a key, and a value field that includes the pilot's blockchain address 411, public key, and the pilot license designation 433.

The previous section described a simplified case study for a cross-validation service using multiple blockchains for the purpose of licensing. In some embodiments, there may be several participants, each of which may certify only a small portion of the process. In these examples, rather than storing objects directly in the blockchain value field as shown in FIG. 4, the actual data may be stored in the database 140 such as shown in the example of FIG. 1. In this example, the blockchain 410, 420, and 430, may only contains a hash of the data instead of the actual data records.

FIG. 5 illustrates a method 500 of performing cross-validation of blockchain data according to example embodiments. For example, the method 500 may be performed by a web server, a blockchain peer node, a cloud platform, a service, a combination thereof, and the like, which may be implemented through one or more a computing devices. Referring to FIG. 5, in 510 the method may include receiving a request to certify a digital record. For example, the digital record may be a license, a certificate, a document, an image, a data file, a judgment, and the like. As another example, the digital record may be any type of audio, video, image, text, or combination thereof.

In 520, the method may include retrieving a first hashed data value of the digital record from a data block included among a first hash-linked chain of blocks on a first blockchain, and in 530, the method may include retrieving a second hashed data value of the digital record from a second data block included among a second hash-linked chain of blocks on a second blockchain which is different from the first blockchain. The hashed data values may be associated with the digital record. For example, the hashed data values may include proof submitted by two or more untrusting parties with respect to each other that prove the validity of the digital record (i.e., the content included in the digital record) such as a license, a registration, a certificate, etc. The hashed data values may be stored on the blockchains instead of actual data files (e.g., multimedia files such as documents, records, videos, images, and the like.) Meanwhile, the actual data files may be stored in an off-chain storage such as a database or the like, which is accessible to the nodes of a blockchain. In some embodiments, each of the first and second hashed data values may include a hash of a component of the digital record, a respective upload identifier, and a respective storage identifier.

In 540, the method may include determining whether the digital record is valid based on a cross-validation of the first hashed data value and the second hashed data value. Furthermore, in 550 the method may include storing the determination of the validity of the digital record in a data block among a third hash-linked chain of blocks. For example, the cross-validation may determine that the digital record is valid based on independent content stored on the different blockchains which are untrusting with respect to one another thereby providing an extra layer of proof that the digital record is valid. For example, an instructor and a certification board may separately store documents/images indicating that a person has successfully been certified for a professional license. In some embodiments, the cross validation may include determining whether an identifier of the first hashed data value is stored within a key value associated with the second hashed data value.

In some embodiments, the method may further include transmitting the determination of the validity of the digital record to a computing system associated with the request. In some embodiments, the method may further include storing a first public key for decrypting the first hash data value and a second public key for decrypting the second hash data value in one or more other blocks of a third blockchain which is different from the first and second blockchains. In some embodiments, each of the first and second hashed data values comprise a hash of a component of the digital record, a respective upload identifier, and a respective storage identifier.

Figure 6A:
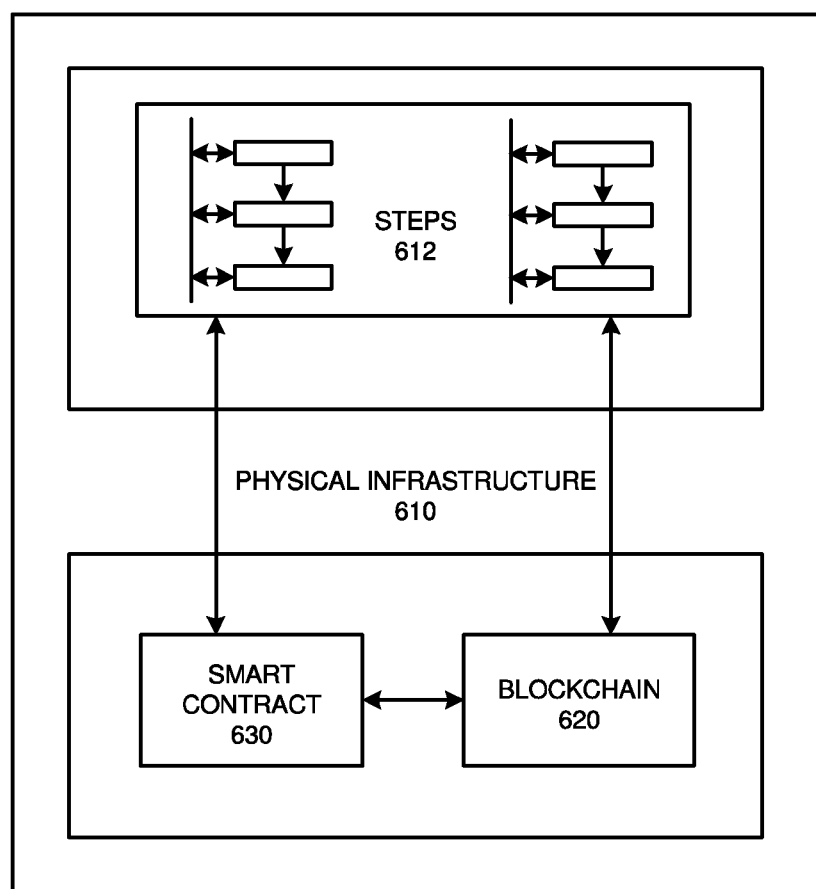
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps 612 may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
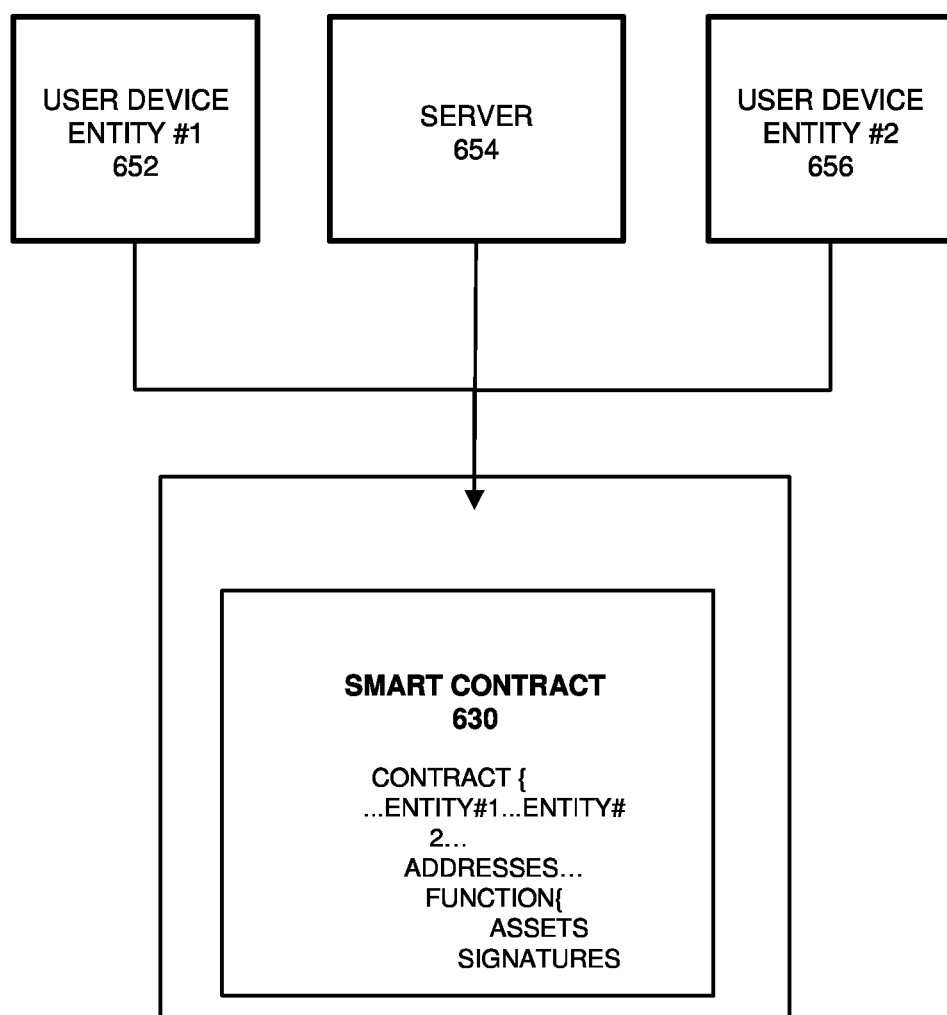
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
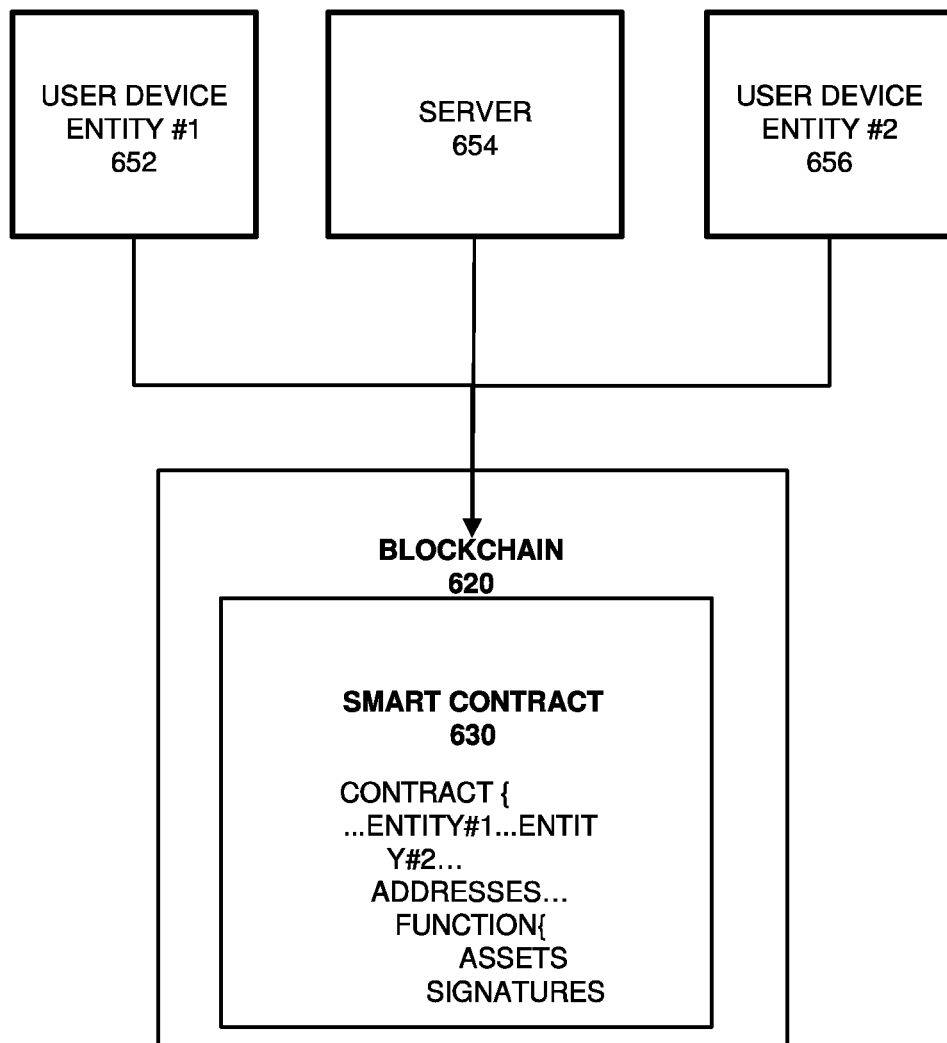
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
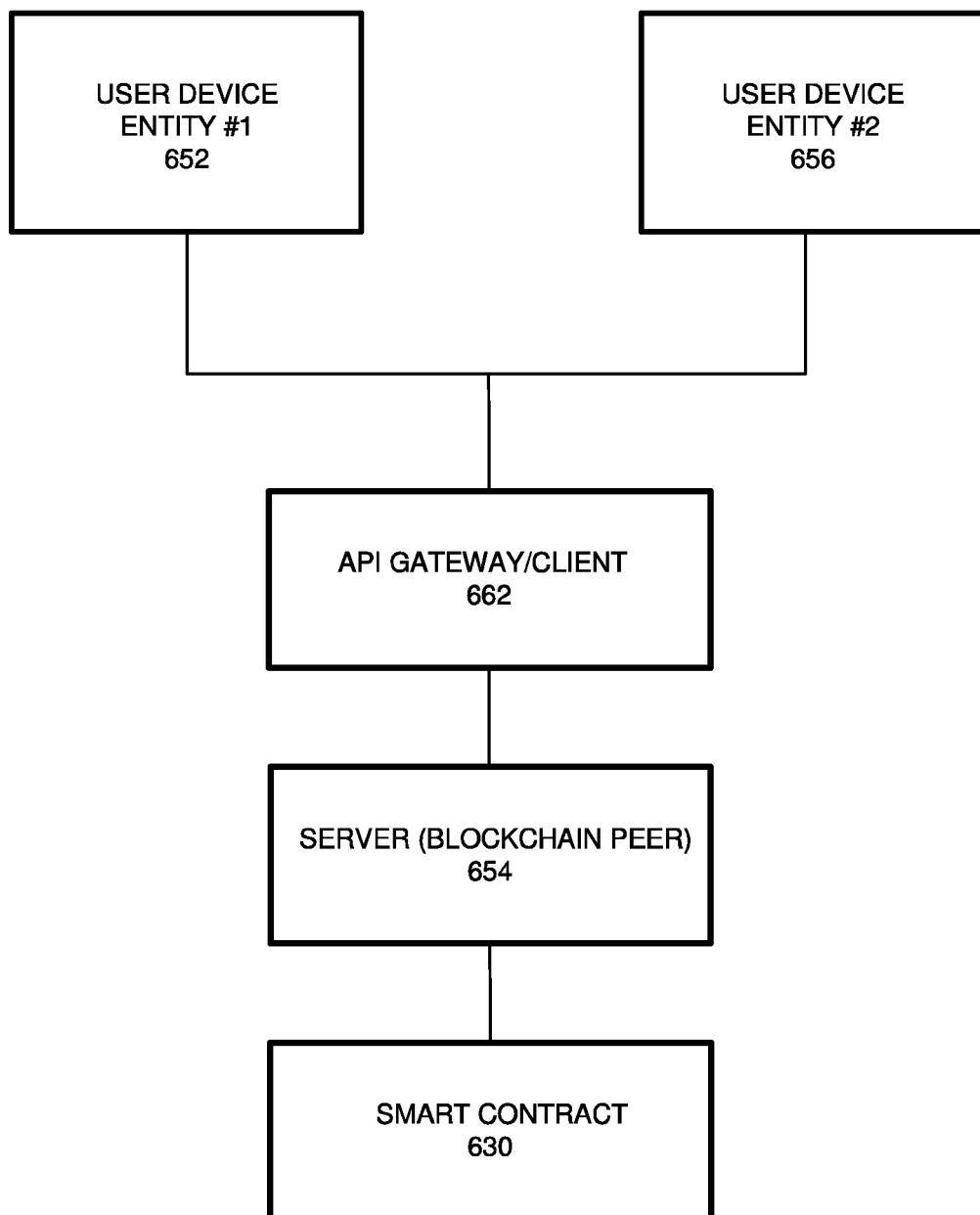
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
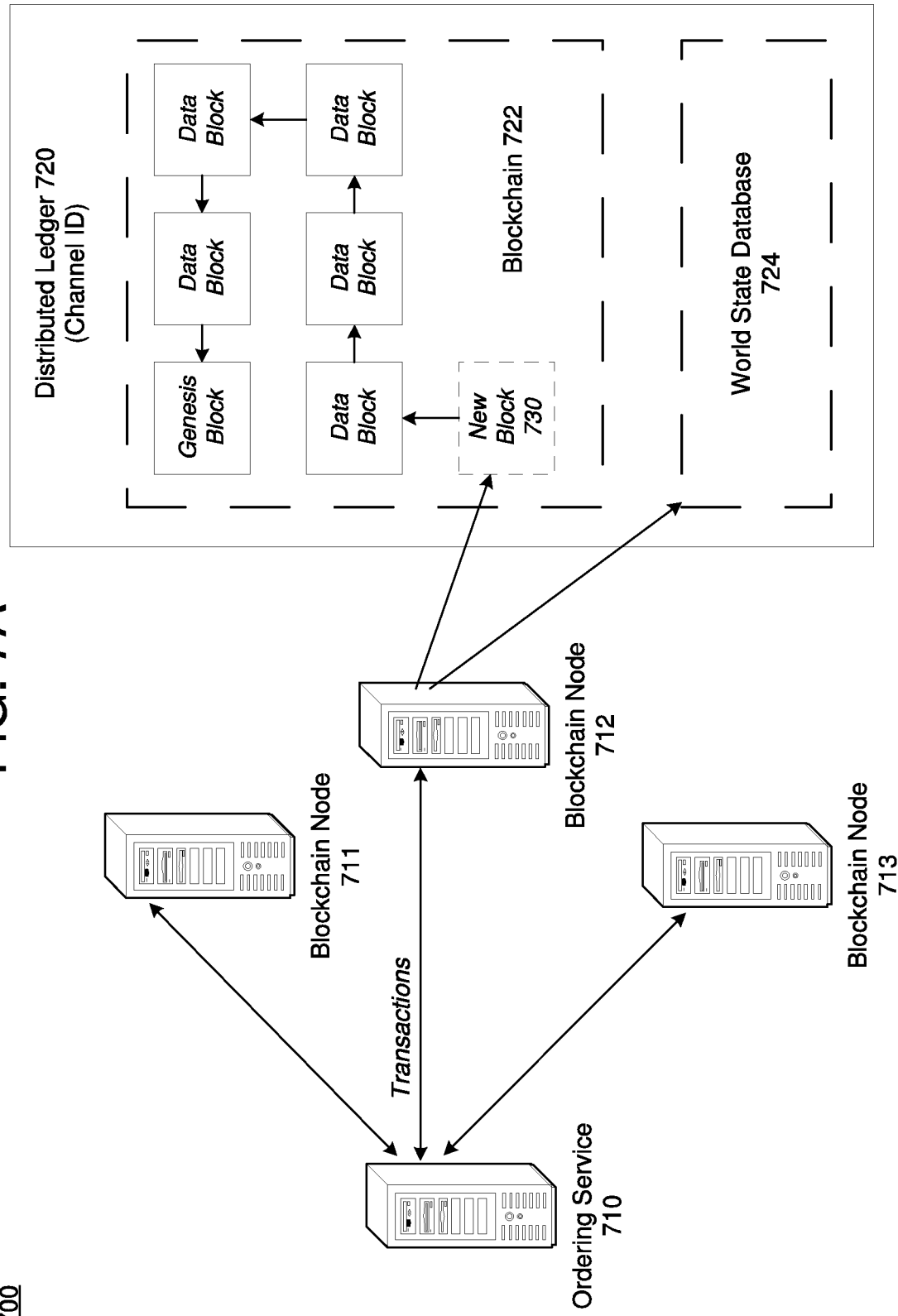
FIG. 7A is a diagram illustrating a process of a new block being added to a blockchain ledger, according to example embodiments.
Figure 7B:
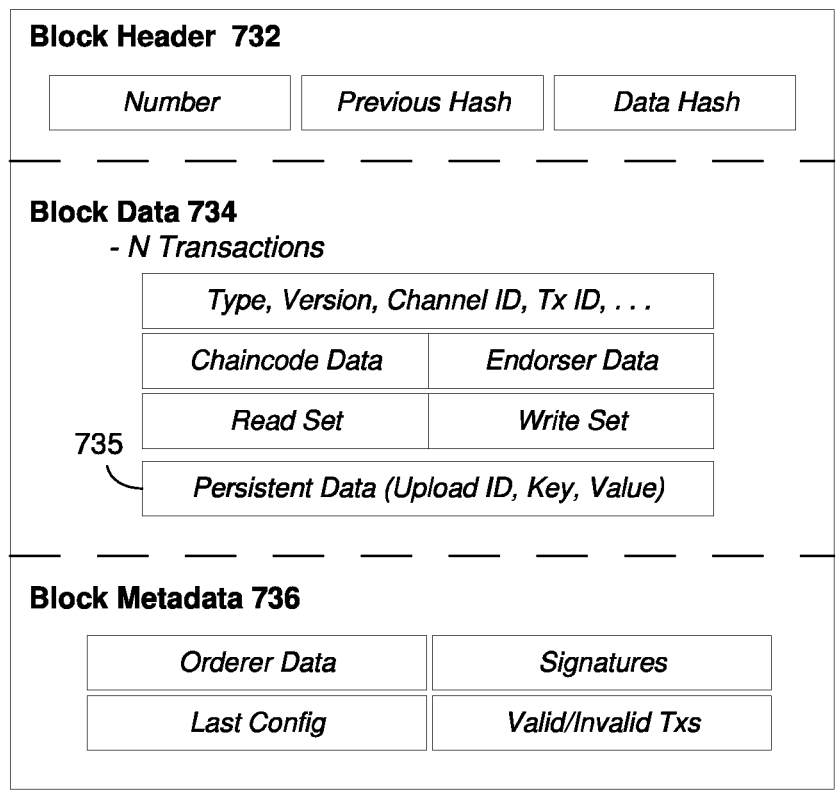
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, in addition to traditional blockchain-based information, the block data 734 may also store persistent data of a digital record 735 that may include an upload ID, a key, a hash value, and the like. In some embodiments, the key may be a transaction ID of a previous storage transaction associated with the digital record. The hash value may include content that provides proof of the digital record. For example, the hash value may be a hash of an image, a video, a document, a description, an email message, an audio, and the like. The persistent data 735 may be determined based on an endorsement policy implemented by nodes of the blockchain and stored within the blockchain when a predetermined number of nodes have endorsed the persistent data 735.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
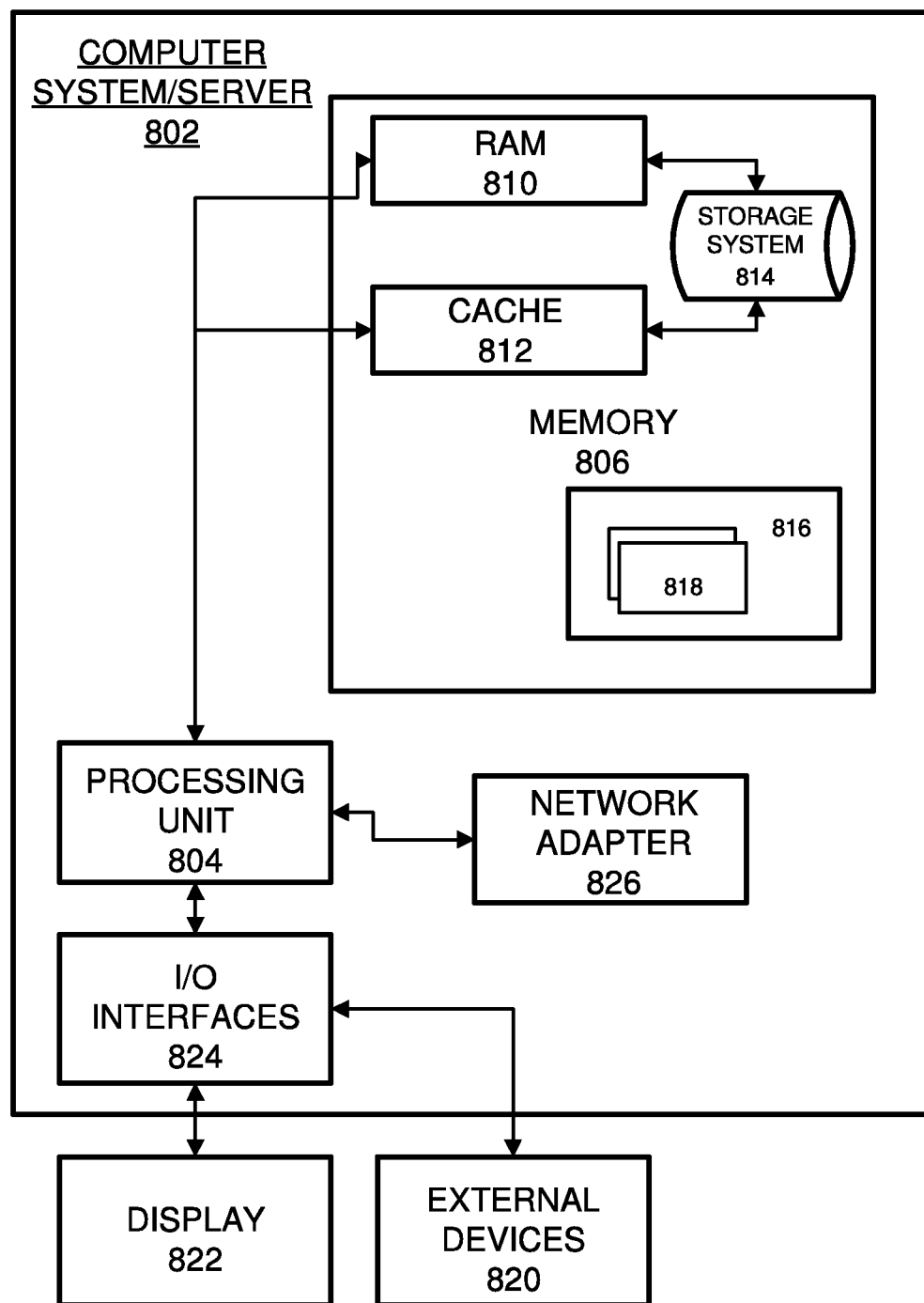
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
   a network interface configured to:
      receive a request to certify a digital record, wherein the request comprises an identifier of the digital record that was created by a web service when the digital record was uploaded to the web service from a client and wherein data of the digital record is stored across a plurality of different blockchains; and
   a hardware-implemented processor that, when executing instructions stored in an associated memory, is configured to:
      retrieve, based on the identifier, a first hashed subset of the data of the digital record from a first blockchain of the plurality of different blockchains, the first blockchain corresponding to a first party,
      retrieve a transaction identifier from the first blockchain, where the transaction identifier is created by the first blockchain and identifies a transaction storing the first hashed subset of the data of the digital record in the first blockchain,
      retrieve, based on the identifier, a second hashed subset of the data of the digital record from a second blockchain of the plurality of different blockchains that is different than the first blockchain and corresponds to a second party that is different than the first party,
      retrieve a transaction identifier from the second blockchain, where the transaction identifier is created by the second blockchain and identifies a transaction storing the second hashed subset of the data of the digital record in the second blockchain,
      retrieve, based on the identifier, a copy of the digital record from a database,
      hash the copy of the digital record,
      compare the hash of the copy of the digital record to the first hashed subset of the data and to the second hashed subset of the data of the digital record to determine whether the digital record is valid, and
      store a first public key to decrypt the first hash data value in one or more blocks of the one or more blockchains of the plurality of blockchains, and store the determination of a validity of the digital record in one or more blockchains of the plurality of blockchains.

2. The computing system of claim 1, wherein a content of the digital record comprises one or more of:
   a video file, an image file, and an audio file.

3. The computing system of claim 1, wherein the hardware-implemented processor is further configured to:
   control the network interface to transmit the determination of a validity of the digital record to a computer system associated with the request.

4. The computing system of claim 1, wherein the first hashed subset of the data of the digital record and the second hashed subset of the data of the digital record comprise a proof of performance of an event associated with the digital record.

5. A method comprising:
   receiving, by a hardware-implemented server executing a web service, a request to certify a digital record, wherein the request comprises an identifier of the digital record that was created by the web service when the digital record was uploaded to the web service from a client and wherein data of the digital record is stored across a plurality of different blockchains;
   retrieving, by the hardware-implemented server, a first hashed subset of the data of the digital record from a first blockchain of the plurality of different blockchains based on the identifier, the first blockchain corresponding to a first party;
   retrieving, by the hardware-implemented server, a transaction identifier from the first blockchain, where the transaction identifier is created by the first blockchain and identifies a transaction storing the first hashed subset of the data of the digital record in the first blockchain;
   retrieving, by the hardware-implemented server, a second hashed subset of the data of the digital record from a second blockchain of the plurality of different blockchains that is different than the first blockchain based on the identifier and corresponds to a second party that is different than the first party;

retrieving, by the hardware-implemented server, a transaction identifier from the second blockchain, where the transaction identifier is created by the second blockchain and identifies a transaction storing the second hashed subset of the data of the digital record in the second blockchain;

retrieving, by the hardware-implemented server, a copy of the digital record from a database;

hashing, by the hardware-implemented server, the copy of the digital record;

comparing, by the hardware-implemented server, the hash of the copy of the digital record to the first hashed subset of the data and to the second hashed subset of the data of the digital record to determine whether the digital record is valid; and storing, by the hardware-implemented server, a first public key to decrypt the first hash data value in one or more blocks of the one or more blockchains of the plurality of blockchains, and storing the determination of a validity of the digital record in one or more blockchains of the plurality of blockchains.

6. The method of claim 5, wherein content of the digital record comprises one or more of:

a video file, an image file, and an audio file.

7. The method of claim 5, wherein the method further comprises:

transmitting the determination of a validity of the digital record to a computing system associated with the request.

8. The method of claim 5, wherein the first hashed subset of the data of the digital record and the second hashed subset of the data of the digital record comprise a proof of performance of an event associated with the digital record.

9. A non-transitory computer-readable medium comprising instructions that, when executed by a processor server executing a web service, cause the processor to perform:

receiving a request to certify a digital record, wherein the request comprises an identifier of the digital record that was created by the web service when the digital record was uploaded to the web service from a client and wherein data of the digital record is stored across a plurality of different blockchains, the first blockchain corresponding to a first party;

retrieving a first hashed subset of the data of the digital record from a first blockchain of the plurality of different blockchains based on the identifier;

retrieving a transaction identifier from the first blockchain, where the transaction identifier is created by the first blockchain and identifies a transaction storing the first hashed subset of the data of the digital record in the first blockchain;

retrieving a second hashed subset of the data of the digital record from a second blockchain, of the plurality of different blockchains, that is different than the first blockchain based on the identifier and corresponds to a second party that is different than the first party;

retrieving a transaction identifier from the second blockchain, where the transaction identifier is created by the second blockchain and identifies a transaction storing the second hashed subset of the data of the digital record in the second blockchain;

retrieving, by the hardware-implemented server, a copy of the digital record from a database;

hashing the copy of the digital record;

comparing the hash of the copy of the digital record to the first hashed subset of the data and to the second hashed subset of the data of the digital record to determine whether the digital record is valid; and storing a first public key to decrypt the first hash data value in one or more blocks of the one or more blockchains of the plurality of blockchains, and storing the determination of a validity of the digital record in one or more blockchains of the plurality of blockchains.

10. The non-transitory computer-readable medium of claim 9, wherein content of the digital record comprises one or more of:

a video file, an image file, and an audio file.

11. The non-transitory computer-readable medium of claim 9, wherein the instructions further cause the processor to perform:

transmitting the determination of a validity of the digital record to a computing system associated with the request.

12. The non-transitory computer-readable medium of claim 9, wherein the first hashed subset of the data of the digital record and the second hashed subset of the data of the digital record comprise a proof of performance of an event associated with the digital record.

* * * * *